(12) United States Patent
Horng et al.

(10) Patent No.: US 8,299,735 B2
(45) Date of Patent: Oct. 30, 2012

(54) FAN SYSTEM AND BRAKE CONTROL CIRCUIT THEREOF

(75) Inventors: Alex Horng, Kaohsiung (TW); Tung-An Chen, Kaohsiung (TW); Cheng-Nan Tsai, Kaohsiung (TW); Kun-Tien Wu, Kaohsiung (TW); Kuan-Yin Hou, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 409 days.

(21) Appl. No.: 12/694,748

(22) Filed: Jan. 27, 2010

(65) Prior Publication Data

US 2011/0181213 A1     Jul. 28, 2011

(51) Int. Cl.
*H02P 3/22* (2006.01)

(52) U.S. Cl. ........ 318/379; 318/786; 318/377; 318/370; 318/366; 318/362; 318/759; 318/364; 318/365; 318/375

(58) Field of Classification Search .................. 318/786, 318/376, 377, 370, 366, 362, 379, 759, 364, 318/365, 375
See application file for complete search history.

(56) References Cited

U.S. PATENT DOCUMENTS

| | | | | |
|---|---|---|---|---|
| 4,134,653 A * | 1/1979 | Ishiguro et al. | ............... | 396/259 |
| 5,122,921 A * | 6/1992 | Koss | ............... | 361/111 |
| 5,247,140 A * | 9/1993 | Iwasa et al. | ............... | 187/288 |
| 5,294,874 A | 3/1994 | Hessenberger et al. | | |
| 5,341,077 A * | 8/1994 | Chen et al. | ............... | 318/434 |
| 5,449,992 A | 9/1995 | Geiger et al. | | |
| 5,552,686 A * | 9/1996 | Schmid et al. | ............... | 318/362 |
| 6,291,952 B1 * | 9/2001 | Roth-Stielow et al. | ....... | 318/375 |
| 6,664,750 B2 * | 12/2003 | Pelonis | ............... | 318/400.29 |
| 7,064,518 B1 * | 6/2006 | Hsieh | ............... | 318/802 |
| 2004/0066159 A1 | 4/2004 | Zack et al. | | |

* cited by examiner

*Primary Examiner* — Rita Leykin
(74) *Attorney, Agent, or Firm* — Muncy, Geissler, Olds & Lowe, PLLC

(57) ABSTRACT

A fan system including a motor with a coil, a storage unit, a driver, and a buffer circuit is provided. The coil module has a first connection terminal and a second connection terminal. The storage unit electrically couples with a voltage source, stores electrical energy when the voltage source is available, and releases the stored electrical energy to carry out a brake operation when the voltage source is unavailable. The driver electrically couples with the first and second connection terminals of the coil module to control a direction of an inductor current passing through the coil module. The buffer circuit electrically couples with the coil module. In the brake operation, the buffer circuit operates to form a transient potential between the first and second connection terminals of the coil module and to consume electrical energy of the inductor current, for gradually stopping the motor in a buffering time period.

42 Claims, 5 Drawing Sheets

FAN SYSTEM AND BRAKE CONTROL CIRCUIT THEREOF

BACKGROUND OF THE INVENTION

1. Field of the Invention

The present invention relates to a fan system and brake control circuit thereof, particularly to a brake control circuit of a fan system including a buffer circuit to gradually stop the operation of the fan system.

2. Description of the Related Art

Recently, it is general in relative fields to complete electronic products by a combination of micro-controller unit (MCU) and a drive circuit with electronic power switches. However, in operation of the electronic product, a great amount of heat is generated due to high frequency control of the MCU and electronic power switches, and thus cooling efficiency of the electronic product becomes an important issue. In the present day, a conventional way to achieve a cooling purpose is to dissipate heat generated by the electronic product with a fan system. Besides, a stop control circuit is usually applied to the fan system to provide some functions in speed control and operation security, so as to rapidly stop rotation of a fan wheel of the fan system after operating power of the fan system is off.

Referring to FIG. 1, a conventional fan system includes a bridge driver 91, a control unit 92, a reservoir capacitor 93, a brake circuit 94, and a motor coil 95. In order to provide the above-mentioned elements with required power, a voltage source VCC is connected to the bridge driver 91, control unit 92, reservoir capacitor 93, and brake circuit 94. The bridge driver 91 includes two upper bridge power switches M91, M94 preferably being P-type transistors such as P-channel MOSFETs and two lower bridge power switches M92, M93 preferably being N-type transistors such as N-channel MOSFETs. The brake circuit 94 includes two power switches M95, M96 respectively connecting with the two lower bridge power switches M92, M93 of the bridge driver 91. The control unit 92 includes four control output ports separately connecting with the two power switches M95, M96 and another two power switches M97, M98, which respectively connect with and control the two upper bridge power switches M91, M94. The reservoir capacitor 93 serially links the earth and a joint between the voltage source VCC and the bridge driver 91. The motor coil 95 includes two ends, with one of the two ends connecting with a joint between the upper bridge power switch M91 and the lower bridge power switch M93, and with the other end connecting with a joint between the upper bridge power switch M94 and the lower bridge power switch M92.

When the voltage source VCC normally provides the fan system with power, the control unit 92 sends out a set of control signals to operate the bridge driver 91 and the brake circuit 94 for a current to alternatively flow from the voltage source VCC to the ground in two paths, with one of the paths going through the upper bridge power switch M91, motor coil 95, and lower bridge power switch M92 in sequence while the other one of them goes through the upper bridge power switch M94, motor coil 95, and lower bridge power switch M93 in sequence. Therefore, with said two paths, the motor coil 95 is provided with an alternating current to generate alternate magnetic fields. Furthermore, in this situation, the voltage source VCC continuously charges the reservoir capacitor 93 till the reservoir capacitor 93 stores power energy of a predetermined level.

Alternatively, when the voltage source VCC is turned off, the control unit 92 does not generate the control signals for the bridge driver 91 and brake circuit 94 any more, and therefore the two switches M95, M96 are off. Besides, in this situation, with the electrical power previously stored in the reservoir capacitor 93 and the connection between the reservoir capacitor 93 and two control ports of the two lower bridge power switches M92, M93, said two control ports are switched on by the pre-stored electrical power. Accordingly, the two ends of the motor coil 95 are forced to be at the same voltage level, and therefore the fan system is actuated to stop rapidly.

However, there are still some drawbacks of this conventional fan system shown as the following. Due to an immediate change in voltage across the motor coil 95 at the moment when the voltage source VCC is turned off and voltage levels of the ends are made equal suddenly and forcibly, a current passing through the motor coil 95 is suddenly dropped to zero and induces an electromotive force resulting in electromagnetic interference. In the meantime, with the two ends of the motor coil 95 being grounded through the lower bridge power switches M92, M93, the induced electromotive force is immediately discharged and causes a great magnetic stress on the motor coil 95. Therefore, vibration and noise generated by the fan system are increased, which further leads to low operational stability of peripheral circuits and short lifetime of the fan system. Hence, there is a need of improvement in the conventional fan system and brake control circuit thereof.

SUMMARY OF THE INVENTION

The primary objective of this invention is to provide a fan system and a brake control circuit thereof with enhanced operational stability of peripheral circuits and long lifetime.

The secondary objective of this invention is to provide a fan system and a brake control circuit thereof with low vibration and noise during operation.

The fan system in accordance with an aspect of the present invention comprises a motor with a coil, a storage unit, a driver, and a buffer circuit. The coil module has a first connection terminal and a second connection terminal. The storage unit electrically couples with a voltage source, stores electrical energy when the voltage source is available, and releases the stored electrical energy to carry out a brake operation when the voltage source is unavailable. The driver electrically couples with the first and second connection terminals of the coil module to control a direction of an inductor current passing through the coil module. The buffer circuit electrically couples with the coil module. In the brake operation, the buffer circuit operates to form a transient potential between the first and second connection terminals of the coil module and to consume electrical energy of the inductor current, for gradually stopping the motor in a buffering time period.

The brake control circuit of a fan system in accordance with another aspect of the present invention comprises a buffer circuit. The buffer circuit is actuated when a voltage source of a fan system is turned off. After being actuated, the buffer circuit forming a transient potential between a first connection terminal and a second connection terminal of a coil module of the fan system for consuming an inductor current of the coil module, so as to gradually stop the fan system in a buffering time period.

Further scope of the applicability of the present invention will become apparent from the detailed description given hereinafter. However, it should be understood that the detailed description and specific examples, while indicating preferable embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
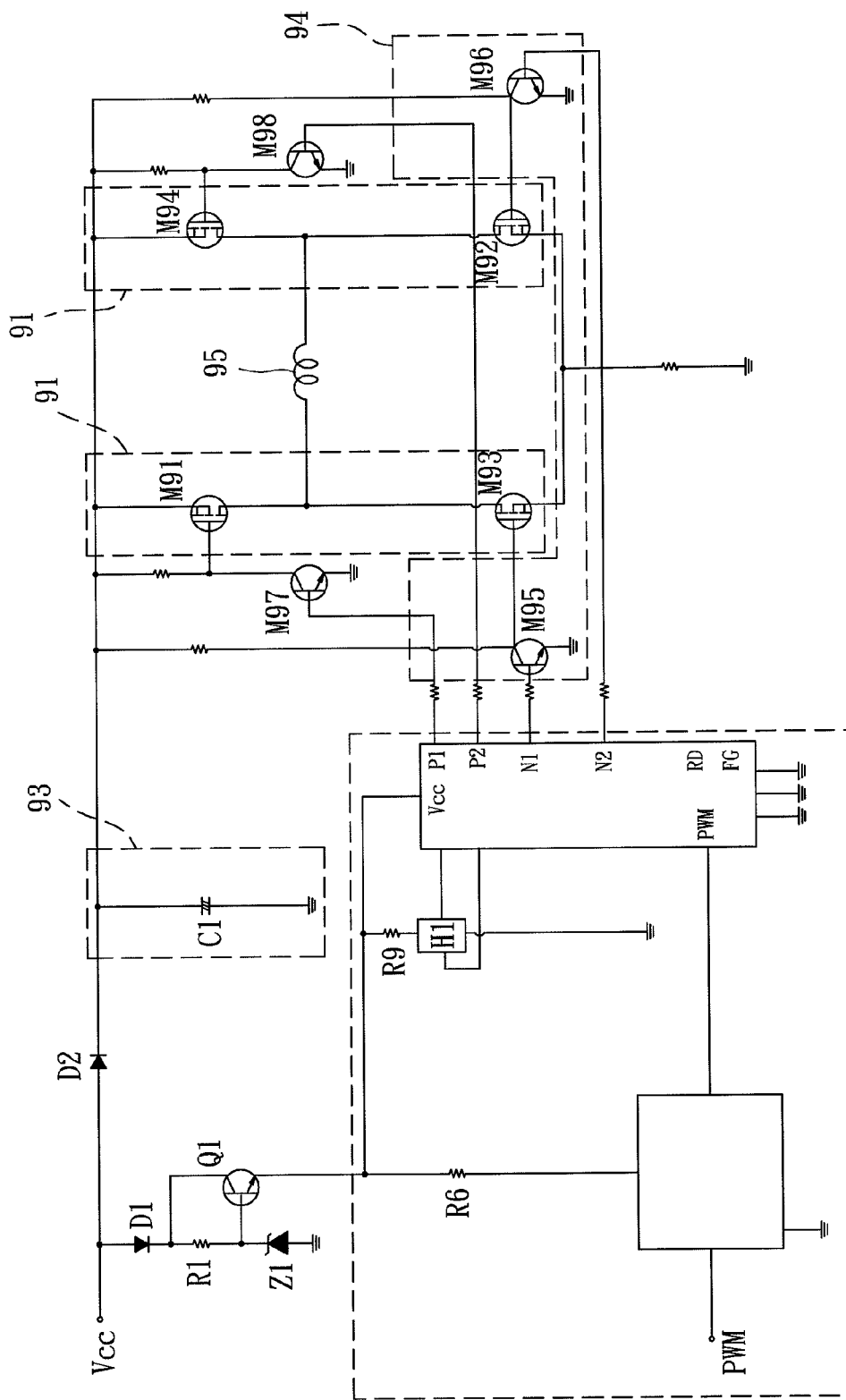
FIG. 1 is a schematic circuitry of a conventional fan system.

In the various figures of the drawings, the same numerals designate the same or similar parts. Furthermore, when the term "first," "second," "predetermined," "upper," "lower," and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 2:
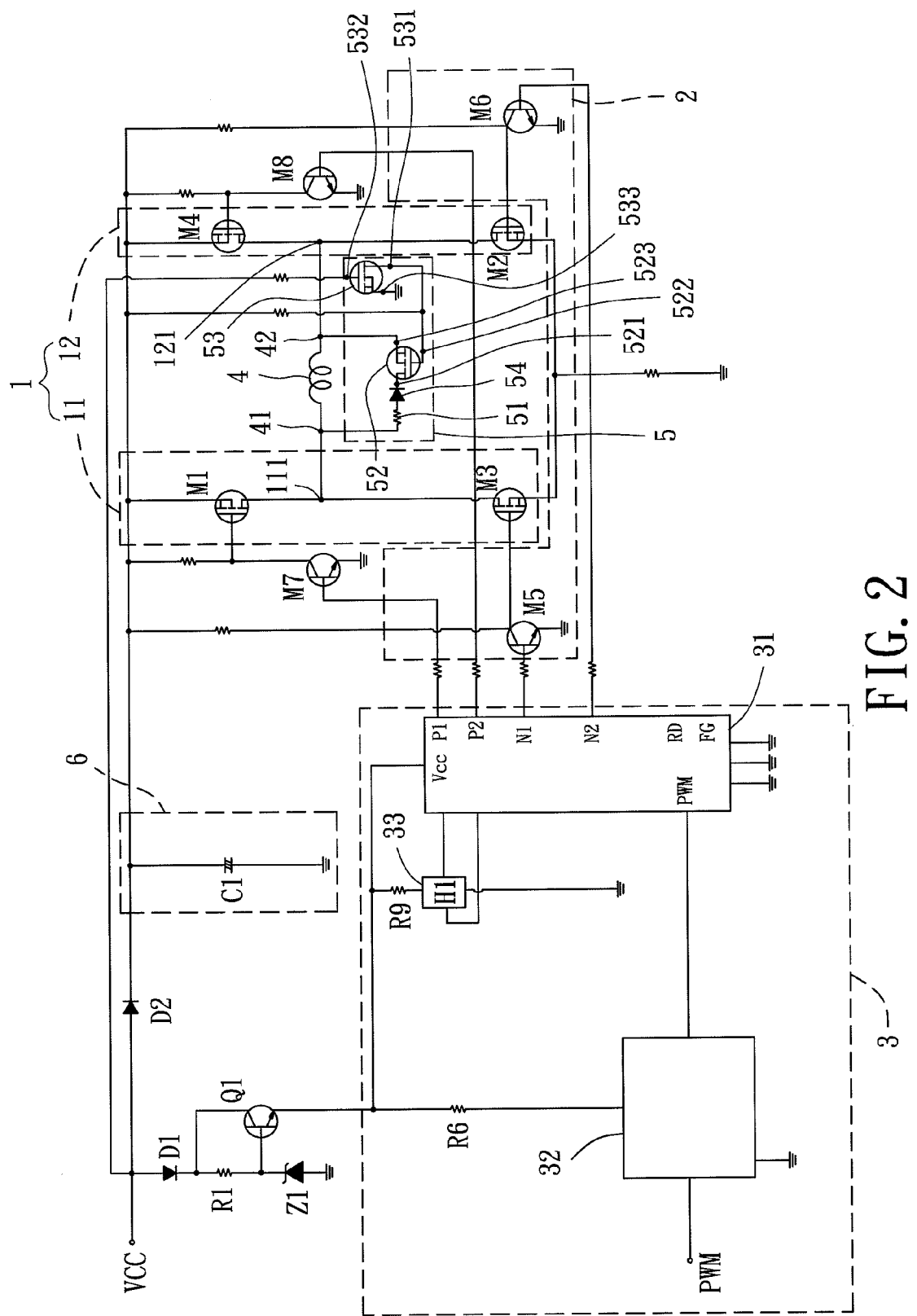
FIG. 2 is a schematic circuitry of a fan system and a brake control circuit thereof in accordance with a first embodiment of the present invention.

Referring to FIG. 2, a fan system and a brake control circuit thereof of a first embodiment of the present invention are shown, with the fan system including a driver 1, a brake circuit 2, a control circuit 3, a motor with a coil module 4, a buffer circuit 5, and a storage unit 6. The driver 1, brake circuit 2, control circuit 3, buffer circuit 5, and storage unit 6 are electrically connected with a voltage source VCC to receive electrical power for operation. The coil module 4 couples with the driver 1, the buffer circuit 5 couples with the coil module 4 in parallel connection, and the storage unit 6 couples with the driver 1 and brake circuit 2 and is used to store electrical energy. In detail, when the voltage source VCC is turned off, the storage unit 6 releases electrical energy previously stored therein for the fan system to carry out a brake operation. Moreover, a combination of the brake circuit 2, buffer circuit 5, and storage unit 6 is defined as the brake control circuit of the present fan system.

The driver 1 includes a plurality of electronic power switches to complete a full bridge driver or a half bridge driver according to a number of phases of the motor. Preferably, as shown in FIG. 2, when the motor is a single-phase motor, the driver 1 is a full bridge driver constructed by four electronic power switches M1-M4 that are preferably transistors such as MOSFETs, with the two electronic power switches M1, M3 being serially connected with each other to form a first arm 11 and a first joint 111, and with the other two electronic power switches M2, M4 also being serially connected with each other to form a second arm 12 and a second joint 121. Furthermore, the two electronic power switches M1, M4, which are preferably P-channel MOSFETs, define an upper switch module, and the two electronic power switches M2, M3, which are preferably N-channel MOSFETs, define a lower switch module. Moreover, the driver 1 further includes another two electronic power switches M7, M8 that are preferably transistors such as BJT as shown in FIG. 2. Respectively, the electronic power switches M7, M8 provide two output terminals, each of which may be the collector of a BJT, to couple with the two electronic power switches M1, M4 of the upper switch module.

According to the design of the lower switch module of the driver 1, the brake circuit 2 includes two electronic power switches M5, M6 that are preferably transistors such as BJT as shown in FIG. 2. An output terminal of each of the electronic power switches M5, M6, which may be the collector of a BJT, couples with the storage unit 6 in parallel connection. Besides, the two output terminals of the electronic power switches M5, M6 respectively couple with two input terminals of the two electronic power switches M2, M3 of the lower switch module, wherein each of the input terminals may be the gate of a MOSFET.

The control unit 3 includes a control member 31, a PWM transforming circuit 32, and a position sensor 33 such as a Hall sensor. The control member 31 couples with the PWM transforming circuit 32 and position sensor 33 to respectively receive a speed command and a position signal, so as to generate a set of control signals accordingly. The PWM transforming circuit 32 receives an input command defined by a user to generate the speed command. The position sensor 33 detects the position of a rotor of the motor and accordingly generates the position signal. Therefore, through the speed command and position signal, the control member 31 can determine the position of the rotor and generate the control signals according to the input command. Specifically, there are four control terminals P1, P2, N1, N2 provided by the control member 31 and coupling with the electronic power switches M5, M6 of the brake circuit 2 and two input terminals of the electronic power switches M7, M8, with each of said input terminals of the electronic power switches M7, M8 preferably being the base of a BJT as shown in FIG. 2. Therefore, the four control terminals P1, P2, N1, N2 of the control member 31 can control the four electronic power switches M1-M4 through the electronic power switches M5-M8 with the set of control signals, and thus operates the driver 1 and brake circuit 2.

The coil module 4 is also designed according to the number of phases of the motor and is of a single-phase coil winding in this embodiment. However, designs of the coil module 4 and driver 1 can be alternated in conventional way while the motor is a two-phase motor or a three-phase motor. In this embodiment, the coil module 4 includes first and second connection terminals 41, 42 respectively coupling with the first and second joints 111, 121 of the driver 1 for the electronic power switches M1-M4 of the driver 1 to control a direction of a current flow passing through the coil module 4.

The buffer circuit 5 includes a buffer element 51, an actuating member 52, and a power state sensing switch 53. Preferably, because the buffer element 51 is employed to absorb inductive energy, a buffer resistor with small rated resistance such as 1 ohm or less than 1 ohm to serve as the buffer element 51 is used to avoid load effect. The actuating member 52 is in series connection with the buffer element 51, with a combination circuit of the buffer element 51 and actuating member 52 coupling with the coil module 4 in parallel connection, that is, two ends of said combination circuit connecting with the two connection terminals 41, 42 respectively. Accordingly, a buffering close loop is defined by the coil module 4, buffer element 51, and actuating member 52. Besides, the power state sensing switch 3 electrically couples with and sends a result signal to the actuating member 52 for control. Furthermore, when the buffer resistor serves as the buffer element 51, resistance of this buffer resistor and inductance of the coil module 4 jointly determine a buffering time period, which is a time period of the brake operation.

Specifically, the actuating member 52 and power state sensing switch 53 of the buffer circuit 5 are switches preferably constructed by transistors. In the following, for the convenience in further illustration, both of the actuating member 52 and power state sensing switch 53 are N-channel MOSFETs and the actuating member 52 has a drain 521, a gate 522, and a source 523 while the power state sensing switch 53 also has a drain 531, a gate 532, and a source 533. The drain 521 of the actuating member 52 connects with one end of the buffer element 51, and another end of the buffer element 51 connects with the first connection terminal 41 of the coil module 4. The gate 522 of the actuating member 52 connects with the storage unit 6 and the drain 531 of the power state sensing switch 53. The source 523 of the actuating member 52 connects with the second joint terminal 42 of the coil module 4. Moreover, the gate 532 of the power state sensing switch 53 directly connects with the voltage source VCC while the source 533 of the power state sensing switch 53 connects to the ground. With the above illustrated buffer circuit 5, after the voltage source VCC is turned off and the fan system further executes the brake operation, a circular current flowing in the buffering close loop is accordingly transformed from an inductor current originally passing through the coil module 4. In this embodiment, because the actuating member 52 is an N-channel MOSFET, the circular current flows in a direction from the first connection terminal 41 to the second connection terminal 42 through the buffer element 51 and actuating member 52 sequentially and then back to the first connection terminal 41 through the coil module 4.

In addition, the buffer circuit 5 may further include a diode 54 serially connecting with other elements in the buffering close loop to prevent the inductor current from passing through the actuating member 52 in a reverse direction, so as to protect the actuating member 52 from damage.

Figure 3:
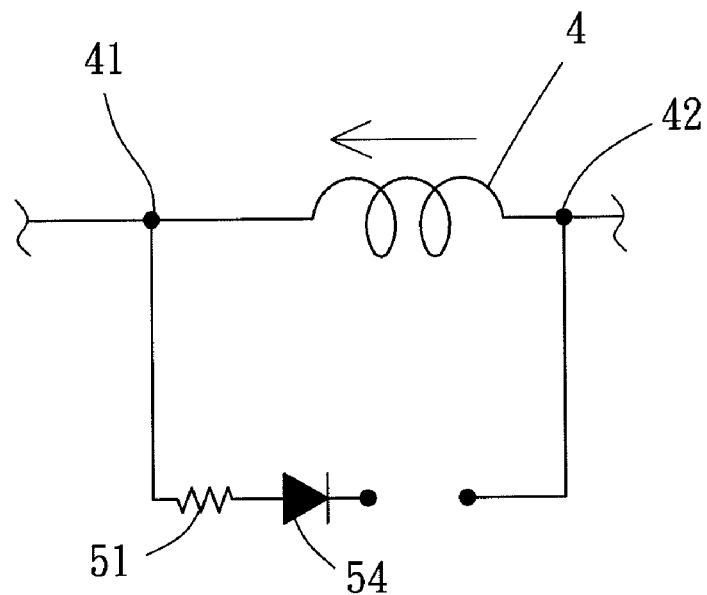
FIG. 3 is a schematic circuitry of a buffer circuit before being actuated in accordance with the first embodiment of the present invention.

When the voltage source VCC normally provides the fan system with power, through control over the electronic power switches M5, M6 of the brake circuit 2 and the electronic power switches M7, M8, the four electronic power switches M1-M4 are simultaneously operated. In detail, both of the electronic power switches M1, M2 are in one of "ON" and "OFF" states while the electronic power switches M3, M4 are in the other one of the two states, and thereby the inductor current of the coil module 4 with alternate directions is formed. Besides, since the voltage source VCC is normally provided, the storage unit 6 is continuously charged till it stores electrical energy to a predetermined level. Please refer to FIGS. 2 and 3 now. Regarding to the operation of the elements in the buffering close loop when the voltage source VCC is provided, the switch constructed by an N-channel MOSFET and serving as the power state sensing switch 53 is in "ON" state due to the direct connection between the gate 532 and the voltage source VCC. Hence, a voltage level at the gate 522 is close to zero, and the switch constructed by an N-channel MOSFET and serving as the actuating member 52 is off. Accordingly, there is no current circularly flowing in the buffering close loop, and the inductor current in coil module 4 does not go through the buffer element 51.

Figure 4:
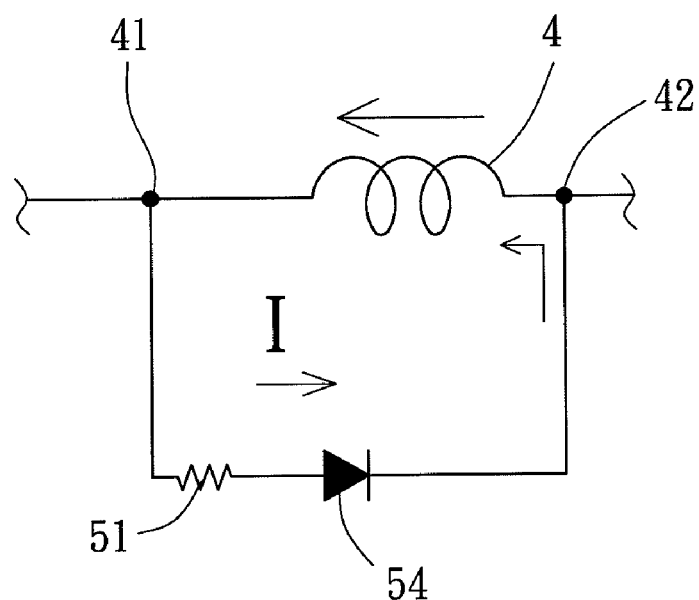
FIG. 4 is a schematic circuitry of the buffer circuit after being actuated.

Alternatively, when the voltage source VCC is turned off, the control unit 3 is also turned off and generates the control signals no more, and thus the electronic power switches M5-M8 are off accordingly. At this time, the storage unit 6 releases electrical energy to turn on the lower switch module constructed by the electronic power switches M2, M3, whose input terminals also couple with the storage unit 6 as shown in FIG. 2. Please refer to FIGS. 2 and 4 now. Regarding to the operation of the elements in the buffering close loop when the voltage source VCC is not in use, the switch serving as the power state sensing switch 53 is off, and the gate 522 of the actuating member 52 receives the electrical energy released by the storage unit 6 to turn on the switch serving as the actuating member 52. Please be noted that an electrical separation between the gate 532 and the storage unit 6 is provided by a diode D2 connecting between the voltage source VCC and the storage unit 6 with a current direction towards the storage unit 6. Therefore, because both of the electronic power switches M2, M3 are on, the inductor current of the coil module 4 is forced to flow in the buffering close loop as the circular current. Accordingly, a transient potential is formed between the first and second connection terminals 41, 42, and the buffer element 51 consumes the electrical energy of the inductor current while the circular current goes through the buffer element 51. As a result, the fan system of the present invention can be stopped gradually in the buffering time period without vibration and noise.

Besides, although the fan system of the present invention can not be stopped immediately, the buffering time period is designable and adjustable by selecting the buffer element 51 with a suitable resistance. Hence, a short, applicable, and desirable time period for gradually stopping the fan system can be acquired. With the brake control circuit of the present fan system, not only said vibration and noise problems but also injury to any user, which occurs in a coast mode operation that does not appropriately limit the time period for stopping, can be avoided.

In order to further clarify and illustrate the defined buffer time period, an example is shown as the following. In this example, a resistance "R" of the buffer element 51 is 1 ohm and the inductance "L" of the coil module 4 is 200 μH. Accordingly, an electrical time constant "t" of the buffering close loop can be obtained by the following equation:

$$t = \frac{L}{R} = \frac{200 \times 10^{-6}(H)}{1(\Omega)} = 200 \text{ (μs)}.$$

Conventionally, the whole discharging time period of a LR circuit is five times of an electrical time period thereof, and thus the discharging time period of the buffering close loop is 1 ms, which means that the buffering time period of the fan system in this example is 1 ms and the fan system can be stopped within 1 ms.

Figure 5:
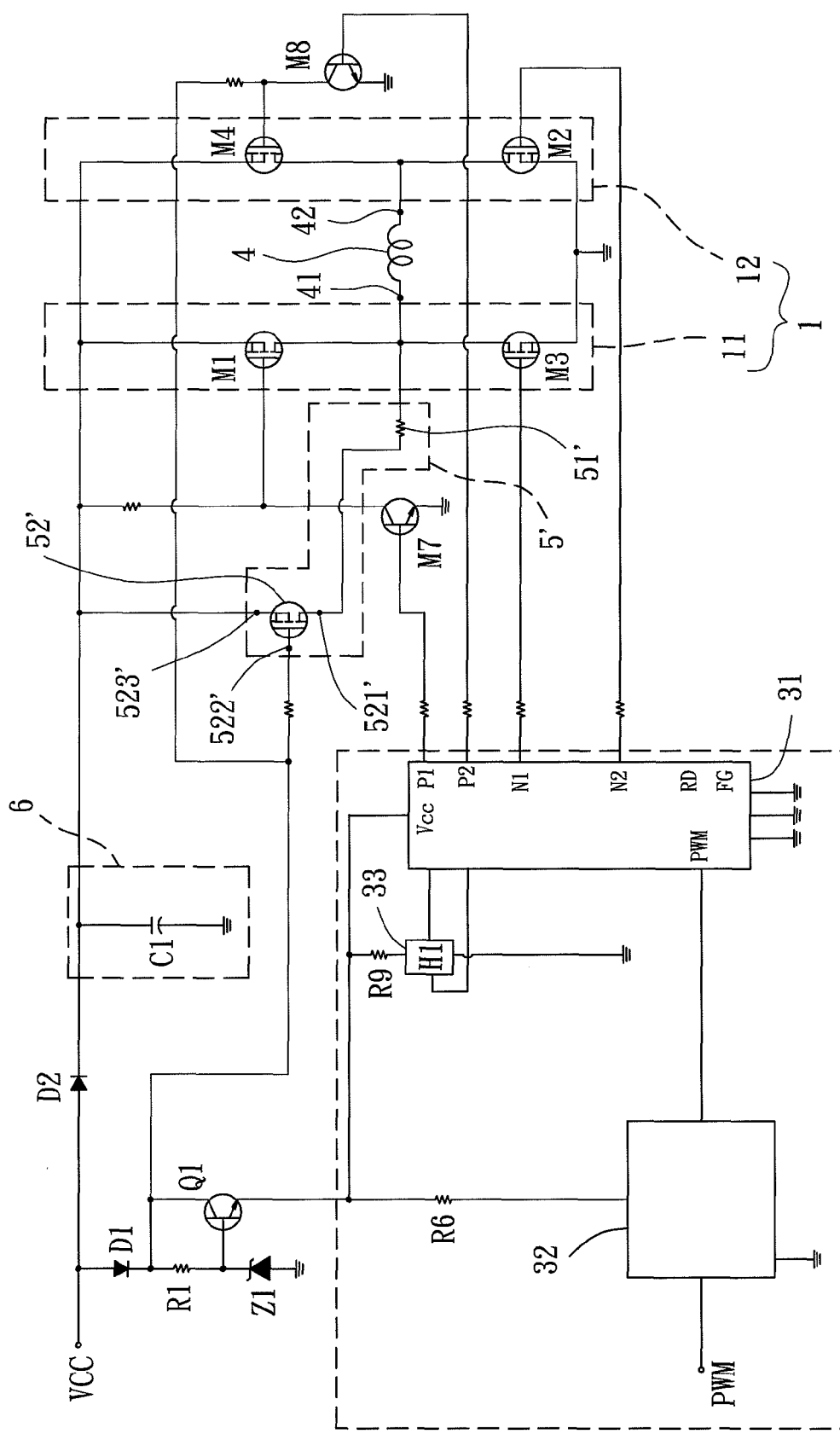
FIG. 5 is a schematic circuitry of a fan system and a brake control circuit thereof in accordance with a second embodiment of the present invention.

Referring to FIG. 5, another fan system and a brake control circuit thereof of a second embodiment of the present invention are shown. In comparison with the fan system of that disclosed in the first embodiment, instead of the brake circuit 2 and buffer circuit 5, only a buffer circuit 5' coupling with the coil module 4 in series connection is used in the second embodiment. The buffer circuit 5' includes a buffer element 51' and an actuating member 52' serially connecting with the buffer element 51' and preferably constructed by a P-type transistor such as a P-channel MOSFET. A combination circuit of the buffer element 51' and actuating member 52' is serially connected between the first connection terminal 41 of the coil module 4 and the storage unit 6. Besides, another difference between these two embodiments is that, in this embodiment, an input terminal of the electronic power switch M4, which is the gate thereof, connects to the voltage source VCC without directly connecting with the storage unit 6, so that the electronic power switch M4 is on when the voltage source VCC is off. Accordingly, another buffering close loop different from that of the first embodiment and constructed by the coil module 4, buffer element 51', actuating member 52', and electronic power switch M4 is provided. Please be noted that the diode D2 between the voltage source VCC and the storage unit 6 with a current direction towards the storage unit 6 is still necessary to prevent the electronic power switch M4 from being affected by the stored electrical energy of the storage unit 6. As a result, when the voltage source VCC is off, the inductor current in the coil module 4 is transformed into a circular current for electrical energy thereof to be consumed by the buffer element 51'.

Detailed illustration of the buffer circuit 5' and operation of the fan system of this embodiment are disclosed as the following. The actuating member 52' includes a drain 521', a gate 522', and a source 523'. The drain 521' connects with one end of the buffer element 51', with another end of the buffer element 51' connecting with the first connection terminal 41 of the coil module 4. The gate 522' connects to the voltage source VCC and is electrically separated from the storage unit 6 by said diode D2. The source 523' connects with the storage unit 6.

When the voltage source VCC normally provides the fan system with power, voltage levels of the gate 522' and source 523' are both equal to that provided by the voltage source VCC, and thus the switch serving as the actuating member 52' is off. Therefore, the four electronic power switches M1-M4 of the driver 1 are simultaneously operated by the control member 31 to form the inductor current of the coil module 4 with alternate directions.

Alternatively, when the voltage source VCC is turned off, the storage unit 6 releases electrical energy for the voltage level of the source 523' to be higher than that of the gate 522', so as to actuate the actuating member 52'. Similarly, with the electrical energy released by the storage unit 6, a voltage level of the source of the electronic power switch M4 is higher than that of the gate thereof, and thus the electronic power switch M4 is also switched on. Accordingly, there is a circular current in the buffering close loop, which is also transformed from the inductor current originally passing through the coil module 4. Hence, the electrical energy of the inductor current can be consumed by the buffer element 51'.

Figure 6:
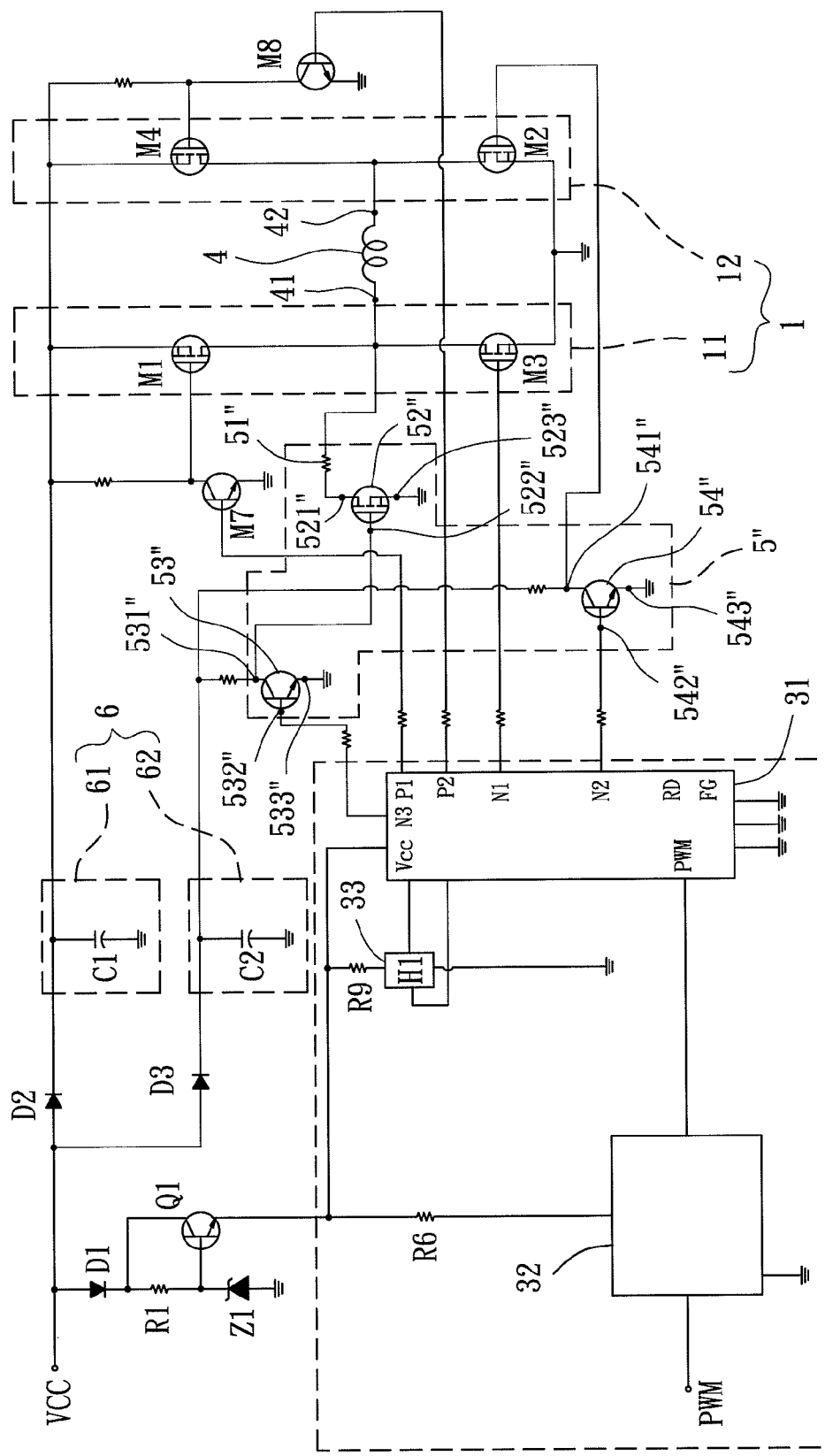
FIG. 6 is a schematic circuitry of a fan system and a brake control circuit thereof in accordance with a third embodiment of the present invention.

Referring to FIG. 6, still another fan system and a brake control circuit thereof of a third embodiment of the present invention are shown. In comparison with the second embodiment, another buffer circuit 5" coupling with the coil module 4 in series connection is used to substitute the buffer circuit 5', and there are first and second storage elements in use to construct the storage unit 6, which are respectively indicative of "61" and "62." In detail, the buffer circuit 5" includes a buffer element 51", an actuating member 52", a first power state sensing switch 53", and a second power state sensing switch 54". The buffer circuit 51" serially connects with the actuating member 52", with a combination circuit of the buffer circuit 51" and actuating member 52" connecting between the first connection terminal 41 of the coil module 4 and the ground. The first power state sensing switch 53" electrically connects with the actuating member 52", while the second power state sensing switch 54" electrically couples with the electronic power switch M2. Therefore, the coil module 4, buffer element 51", actuating member 52", and electronic power switch M2 jointly form a buffering close loop. Besides, the first storage element 61 couples with the two electronic power switches M1, M4 of the upper switch module of the driver 1, and the second storage element 62 couples with the actuating member 52", first power state sensing switch 53", and second power sensor 54". Accordingly, when the voltage source VCC is off, the two power state sensing switches 53", 54" respectively turn on the switch serving as the actuating member 52" and the electronic power switch M2 for transforming the inductor current in the coil module 4 into a circular current in the buffering close loop and consuming the electrical energy of the inductor current.

Detailed illustration of the buffer circuit 5" and operation of the fan system of the third embodiment are disclosed as the following. Preferably, the actuating member 52" is an electronic power switch of N-type transistor such as N-channel MOSFET, and both of the first and second power state sensing switches 53", 54" are electronic power switches of npn BJT. The electronic power switch of the actuating member 52" has a drain 521", a gate 522", and a source 523", while the electronic power switch of the first power state sensing switch 53" has a collector 531", a base 532", and an emitter 533". The drain 521" of the actuating member 52" connects with the first connection terminal 41 of the coil module 4 through the buffer element 51". The gate 522" of the actuating member 52" connects with the collector 531" of the first power state sensing switch 53", with the gate 522" and the collector 531" connecting with the second storage element 62. The source 523" of the actuating member 52" is grounded. The emitter 533" of the first power state sensing switch 53" is also grounded. Besides, the base 532" of the first power state sensing switch 53" electrically connects with another control terminal N3 of the control member 31. Furthermore, the second power state sensing switch 54" provides a collector 541" connecting with the gate of the electronic power switch M2 and the second storage element 62, a base 542" connecting with the control terminal N2 of the control member 31, and an emitter 543" for ground connection.

When the voltage source VCC normally provides the fan system with power, the control terminal N3 of the control member 31 continuously sends out an additional control signal to turn on the switch serving as the first power state sensing switch 53" for the gate 522" of the actuating member 52" to be grounded, so as to turn off the actuating member 52". Thus, the four electronic power switches M1-M4 of the driver 1 are simultaneously operated by the control member 31 to form the inductor current of the coil module 4 with alternate directions.

Alternatively, when the voltage source VCC is turned off, the control terminals N2, N3 provide the first and second power state sensing switches 53", 54" with the control signals no more, and the two power state sensing switches 53", 54" are accordingly turned off. In the meanwhile, the second storage element 62 releases previously stored electrical energy to turn on the actuating member 52" and the electronic power switch M2. Besides, the first storage element 61 also releases electrical energy to ensure the two electronic power switches M1, M4 of the upper switch module in an "OFF" state. As a result, the inductor current of the coil module 4 is transformed into a circular current and flows in the buffering close loop, such that the electrical energy of the inductor current can be consumed by the buffer element 51".

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A fan system, comprising:
   a motor with a coil module having a first connection terminal and a second connection terminal;
   a storage unit electrically coupling with a voltage source, storing electrical energy when the voltage source is available, and releasing the stored electrical energy to carry out a brake operation when the voltage source is unavailable;
   a driver electrically coupling with the first and second connection terminals of the coil module to control a direction of an inductor current passing through the coil module, wherein the driver is a full bridge driver having an upper switch module and a lower switch module, with each of the upper and lower switch modules being constructed by two electronic power switches;
   a buffer circuit electrically coupling with the coil module;
   a control unit electrically coupling with the driver; and
   a brake circuit electrically coupling with the control unit, with the brake circuit having two electronic power switches, with each of the two electronic power switches of the brake circuit having an output terminal, and with the two output terminals respectively coupling with the electronic power switches of the lower switch module through input terminals thereof,
   wherein, in the brake operation, the buffer circuit operates to form a transient potential between the first and second connection terminals of the coil module and to consume electrical energy of the inductor current, for gradually stopping the motor in a buffering time period.

2. The fan system as defined in claim 1, wherein the storage unit electrically couples with the driver and the brake circuit.

3. A fan system, comprising:
   a motor with a coil module having a first connection terminal and a second connection terminal;
   a storage unit electrically coupling with a voltage source, storing electrical energy when the voltage source is available, and releasing the stored electrical energy to carry out a brake operation when the voltage source is unavailable;
   a driver electrically coupling with the first and second connection terminals of the coil module to control a direction of an inductor current passing through the coil module; and
   a buffer circuit electrically coupling with the coil module, wherein the buffer circuit comprises a buffer element and an actuating member in series connection with the buffer element, with a combination circuit of the buffer element and the actuating member coupling with the coil module in parallel connection,
   wherein, in the brake operation, the buffer circuit operates to form a transient potential between the first and second connection terminals of the coil module and to consume electrical energy of the inductor current, for gradually stopping the motor in a buffering time period.

4. The fan system as defined in claim 3, wherein the actuating member electrically couples with the storage unit.

5. The fan system as defined in claim 3, wherein the buffer element and the actuating member of the buffer circuit and the coil module jointly define a buffering close loop.

6. The fan system as defined in claim 5, wherein the buffer circuit further comprises a power state sensing switch electrically coupling with the actuating member to send out a result signal for control over the actuating member.

7. The fan system as defined in claim 6, wherein the actuating member and the power state sensing switch are transistors.

8. The fan system as defined in claim 5, wherein the buffer circuit further comprises a diode serially connecting within the buffering close loop.

9. The fan system as defined in claim 3, wherein the buffer element is a resistor, and resistance of the resistor and inductance of the coil module jointly determine a buffering time period to decide a time period of the brake operation.

10. The fan system as defined in claim 3, wherein the buffer element is a resistor with small resistance not larger than 1 ohm.

11. A fan system, comprising:
   a motor with a coil module having a first connection terminal and a second connection terminal;
   a storage unit electrically coupling with a voltage source, storing electrical energy when the voltage source is available, and releasing the stored electrical energy to carry out a brake operation when the voltage source is unavailable;
   a driver electrically coupling with the first and second connection terminals of the coil module to control a direction of an inductor current passing through the coil module, wherein the driver is a full bridge driver having an upper switch module and a lower switch module, with each of the upper and lower switch modules being constructed by two electronic power switches;
   a buffer circuit electrically coupling with the coil module, wherein the buffer circuit comprises a buffer element and an actuating member in series connection with the buffer element, with a combination circuit of the buffer element and the actuating member coupling between the first connection terminal of the coil module and the storage unit; and
   a control unit electrically coupling with the driver;
   wherein, in the brake operation, the buffer circuit operates to form a transient potential between the first and second connection terminals of the coil module and to consume electrical enemy of the inductor current, for gradually stopping the motor in a buffering time period.

12. The fan system as defined in claim 11, wherein the coil module, the buffer element, the actuating member, and one of the two electronic power switches of the upper switch module jointly define a buffering close loop.

13. The fan system as defined in claim 12, wherein said electronic power switch in the buffering close loop couples with the second connection terminal of the coil module.

14. The fan system as defined in claim 11, wherein the actuating member of the buffer circuit is a P-channel transistor.

15. A fan system, comprising:
   a motor with a coil module having a first connection terminal and a second connection terminal;
   a storage unit electrically coupling with a voltage source, storing electrical energy when the voltage source is available, and releasing the stored electrical energy to carry out a brake operation when the voltage source is unavailable;
   a driver electrically coupling with the first and second connection terminals of the coil module to control a direction of an inductor current passing through the coil module, wherein the driver is a full bridge driver having an upper switch module and a lower switch module, with each of the upper and lower switch modules being constructed by two electronic power switches;
   a buffer circuit electrically coupling with the coil module, wherein the buffer circuit comprises a buffer element, an actuating member, a first power state sensing switch, and a second power state sensing switch, with the buffer element serially connecting with the actuating member, with a combination circuit of the buffer element and the actuating member coupling between the first connection terminal of the coil module and the ground, with the first power state sensing switch electrically coupling with the actuating member, and with the second power state sensing switch electrically coupling with one of the two electronic power switches of the lower switch module; and a control unit electrically coupling with the driver and the buffer circuit;

wherein, in the brake operation, the buffer circuit operates to form a transient potential between the first and second connection terminals of the coil module and to consume electrical energy of the inductor current, for gradually stopping the motor in a buffering time period.

16. The fan system as defined in claim 15, wherein the storage unit comprises a second storage element electrically coupling with the actuating member, the first power state sensing switch, and the second power state sensing switch of the buffer circuit.

17. The fan system as defined in claim 15, wherein the coil module, the buffer element, the actuating member, and said electronic power switch of the lower switch module jointly define a buffering close loop.

18. The fan system as defined in claim 17, wherein said electronic power switch in the buffering close loop electrically coupling with the second connection terminal of the coil module.

19. The fan system as defined in claim 15, wherein the actuating member of the buffer circuit is an N-channel transistor.

20. A brake control circuit of a fan system, comprising:
a buffer circuit actuated when a voltage source of a fan system is turned off, with the actuated buffer circuit forming a transient potential between a first connection terminal and a second connection terminal of a coil module of the fan system for consuming a inductor current of the coil module, so as to gradually stop the fan system in a buffering time period.

21. The brake control circuit of a fan system as defined in claim 20 further comprising a driver being a full bridge driver having an upper switch module and a lower switch module, with each of the upper and lower switch modules being constructed by two electronic power switches.

22. The brake control circuit of a fan system as defined in claim 21 further comprising a control unit electrically coupling with the driver.

23. The brake control circuit of a fan system as defined in claim 22 further comprising a brake circuit electrically coupling with the control unit, with the brake circuit having two electronic power switches, with each of the two electronic power switches of the brake circuit having an output terminal, and with the two output terminals respectively coupling with the electronic power switches of the lower switch module through input terminals thereof.

24. The brake control circuit of a fan system as defined in claim 20, wherein the buffer circuit comprises a buffer element and an actuating member in series connection with the buffer element, with a combination circuit of the buffer element and the actuating member coupling with the coil module in parallel connection.

25. The brake control circuit of a fan system as defined in claim 24, wherein the actuating member electrically couples with a storage unit.

26. The brake control circuit of a fan system as defined in claim 24, wherein the buffer element and the actuating member of the buffer circuit and the coil module jointly define a buffering close loop.

27. The brake control circuit of a fan system as defined in claim 25, wherein the buffer circuit further comprises a power state sensing switch electrically coupling with the actuating member to send out a result signal for control over the actuating member.

28. The brake control circuit of a fan system as defined in claim 27, wherein the actuating member and the power state sensing switch are transistors.

29. The brake control circuit of a fan system as defined in claim 24, wherein the buffer element is a resistor, and resistance of the resistor and inductance of the coil module jointly determine a buffering time period to decide a time period of the brake operation.

30. The brake control circuit of a fan system as defined in claim 24, wherein the buffer element is a resistor with small resistance not larger than 1 ohm.

31. The brake control circuit of a fan system as defined in claim 26, wherein the buffer circuit further comprises a diode serially connecting within the buffering close loop.

32. The brake control circuit of a fan system as defined in claim 23, wherein the buffer circuit comprises a buffer element and an actuating member in series connection with the buffer element, with a combination circuit of the buffer element and the actuating member coupling between the first connection terminal of the coil module and the storage unit.

33. The brake control circuit of a fan system as defined in claim 32, wherein the coil module, the buffer element, the actuating member, and one of the two electronic power switches of the upper switch module jointly define a buffering close loop.

34. The brake control circuit of a fan system as defined in claim 33, wherein said electronic power switch in the buffering close loop couples with the second connection terminal of the coil module.

35. The brake control circuit of a fan system as defined in claim 32, wherein the actuating member of the buffer circuit is a P-channel transistor.

36. The brake control circuit of a fan system as defined in claim 21 further comprising a control unit electrically coupling with the driver and the buffer circuit.

37. The brake control circuit of a fan system as defined in claim 36, wherein the buffer circuit comprises a buffer element, an actuating member, a first power state sensing switch, and a second power state sensing switch, with the buffer element serially connecting with the actuating member, with a combination circuit of the buffer element and the actuating member coupling between the first connection terminal of the coil module and the ground, with the first power state sensing switch electrically coupling with the actuating member, and with the second power state sensing switch electrically coupling with one of the two electronic power switches of the lower switch module.

38. The brake control circuit of a fan system as defined in claim 36 further comprising a first storage element electrically coupling with the driver.

39. The brake control circuit of a fan system as defined in claim 37 further comprising a second storage element electrically coupling with the actuating member, the first power state sensing switch, and the second power state sensing switch of the buffer circuit.

40. The brake control circuit of a fan system as defined in claim 37, wherein the coil module, the buffer element, the actuating member, and said electronic power switch of the lower switch module jointly define a buffering close loop.

41. The brake control circuit of a fan system as defined in claim 40, wherein said electronic power switch in the buffering close loop electrically coupling with the second connection terminal of the coil module.

42. The brake control circuit of a fan system as defined in claim 37, wherein the actuating member of the buffer circuit is an N-channel transistor.

* * * * *